United States Patent
Hubbard

[11] 3,977,773
[45] Aug. 31, 1976

[54] SOLAR ENERGY CONCENTRATOR

[75] Inventor: Warren M. Hubbard, Chula Vista, Calif.

[73] Assignee: Rohr Industries, Inc., Chula Vista, Calif.

[22] Filed: Jan. 17, 1975

[21] Appl. No.: 541,836

[52] U.S. Cl. ............................... 350/292; 126/270
[51] Int. Cl.² ......................... G02B 5/08; F24J 3/02
[58] Field of Search .......... 350/292, 293, 296, 299, 350/310, 288; 343/912, 840; 264/1; 156/245; 126/270, 271; 65/107, 287; 428/313, 322

[56] References Cited
UNITED STATES PATENTS

| | | | |
|---|---|---|---|
| 2,805,974 | 9/1957 | Brucker | 264/1 |
| 2,859,745 | 11/1958 | Von Brudersdorff | 350/292 |
| 3,030,259 | 4/1972 | Long | 350/292 |
| 3,136,674 | 6/1964 | Dunkle et al. | 350/296 |
| 3,150,030 | 9/1964 | Mondano | 343/912 |
| 3,494,231 | 2/1970 | LeVantine | 350/292 |
| 3,713,727 | 1/1973 | Markosian et al. | 350/292 |
| 3,839,129 | 10/1974 | Neumann | 350/293 |
| 3,855,027 | 12/1974 | Erdmann et al. | 156/245 |
| 3,891,421 | 6/1975 | Levin | 65/107 |
| 3,897,294 | 7/1975 | MacTurk | 156/245 |

FOREIGN PATENTS OR APPLICATIONS

| 637,411 | 1/1964 | Belgium | 350/288 |
|---|---|---|---|

Primary Examiner—John K. Corbin
Assistant Examiner—Jon W. Henry
Attorney, Agent, or Firm—Patrick J. Schlesinger; Frank D. Gilliam

[57] ABSTRACT

The reflector surface of the concentrator is formed of plastic type material and includes at least one layer of reinforcing material embedded therein. The concentrator has a parabolic concave inner reflective surface and is constructed either as a unitary member or by joining together a plurality of segmented sections. The reflective surface is provided by a plurality of side by side individual rectangular mirror segments at least partially embedded therein. The reflector is constructed by attaching a flexible backing sheet to one surface of a mirror, scoring the opposite surface in the form of a grid, fracturing the mirror along the grid lines, forming the backing sheet in the desired mirror configuration over a male mold member, positioning at least one layer of reinforcing material adjacent the non-reflective surface of the mirror segments spaced therefrom providing an opening or void therebetween, positioning a mating female mold member over and spaced from the reinforcing material thereby creating a void therebetween, sealing the female mold member to the male mold member circumferentially, filling the voids partially with a liquid expansive material that provides a pressure within the mold when expanding thereby providing strength to the base member and aligning the mirror segments to the desired configuration, curing the expanded expansive material and removing the mold members from the completed concentrator structure.

14 Claims, 7 Drawing Figures

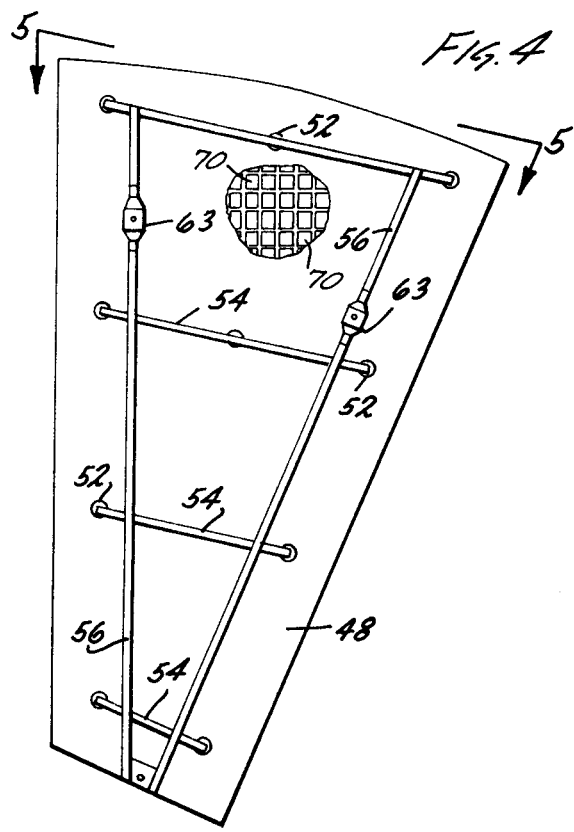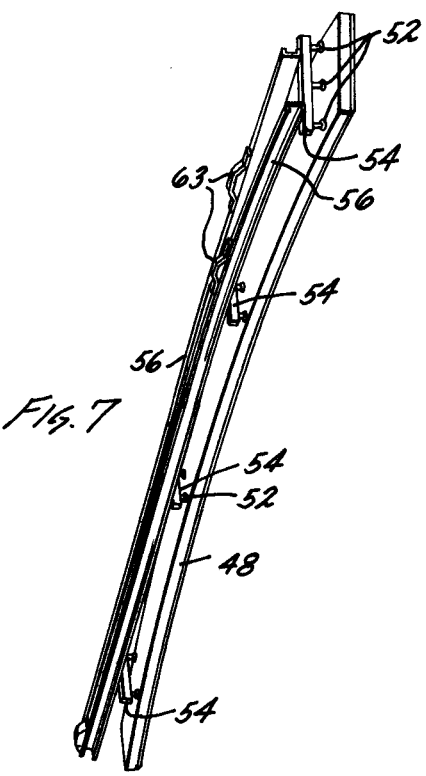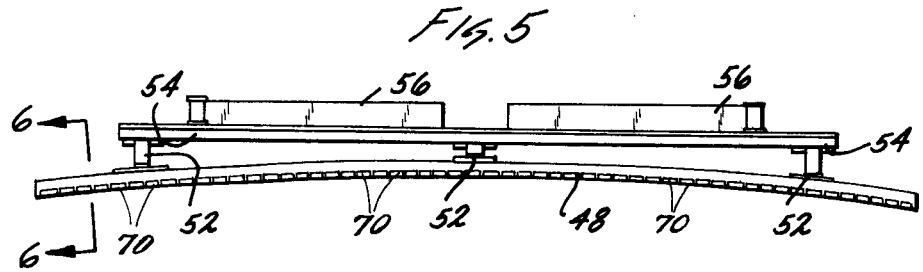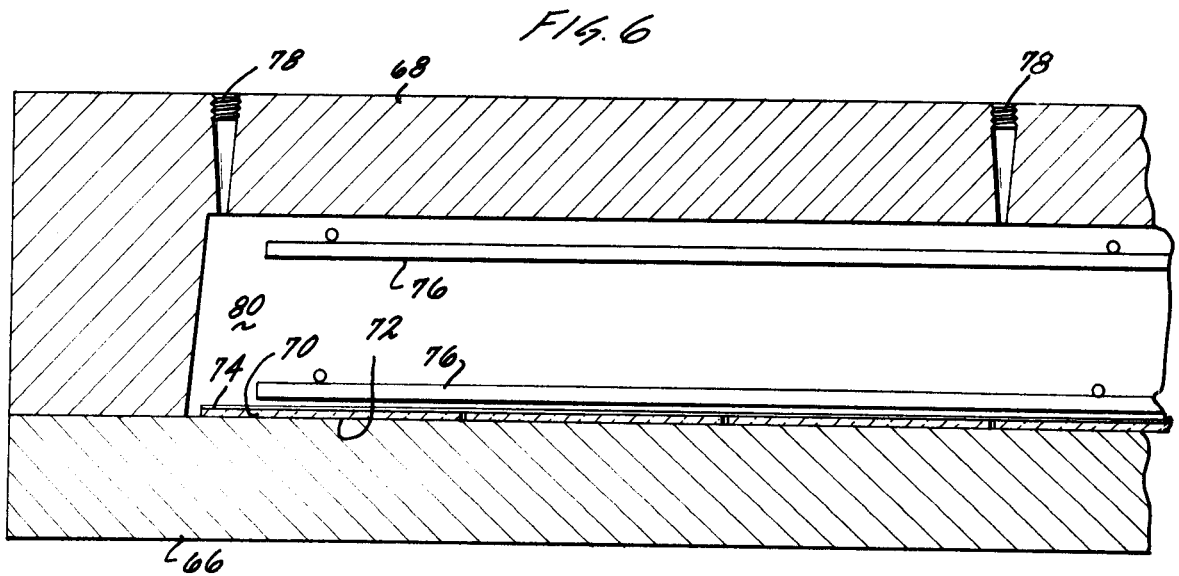

SOLAR ENERGY CONCENTRATOR

BACKGROUND OF THE INVENTION

The invention pertains to a solar energy concentrator and more particularly to an improved concentrator having its reflective surface constructed from a plurality of side by side mirror segments and to an inexpensive method of construction.

The use of parabolic shaped solar energy concentrators is widely known.

The concentrators in common usage are constructed of heavy and expensive material, such as, various types of metals. The inner reflective surface is often constructed from various polished metals, such as, aluminum, stainless steel, silver and the like. This type of construction requires continuous maintenance as there is a tendency for all metals to oxidize or corrode after continued exposure to the elements thus reducing the efficiency of the collector surface.

Other inner reflective surfaces are made from formed one piece silvered or aluminumized glass mirrors. This is the least expensive with regard to initial material costs and upkeep but requires a considerable labor expense for forming the required parabolic shape as a glass mirror is very fragile and is often broken during the forming process. Additionally, large glass structures are easily broken during handling as well as a prey for vandalism.

These and various other problems were not satisfactorily resolved until the emergence of the instant invention.

SUMMARY OF THE INVENTION

In accordance with the instant invention, there is provided an improved solar energy concentrator and method for constructing same that provides an inexpensive, lightweight, long life, low maintenance and easily constructed mirrored glass surfaced parabolic solar energy concentrator.

The foregoing and other features of this invention will become more fully apparent from the following detailed description with reference to the accompanying drawings.

BRIEF DESCRIPTION OF THE DRAWINGS

FIG. 4 is a single panel of concentrator of FIG. 3.

FIG. 5 is an end view of the panel of FIG. 4.

FIG. 6 is a partial, enlarged view of the tip of the panel of FIG. 5 taken along lines 6—6 and includes a partial showing of the mold members.

FIG. 7 is a perspective view of the FIG. 4 panel structure.

DETAILED DESCRIPTION OF THE PREFERRED EMBODIMENTS OF THE INVENTION

The invention pertains to an improved solar concentrator and the method of constructing the same either by the use of a plurality of lightweight panels assembled together to form a parabolic reflector or a single unitary, small and lightweight concentrator.

Figure 1:
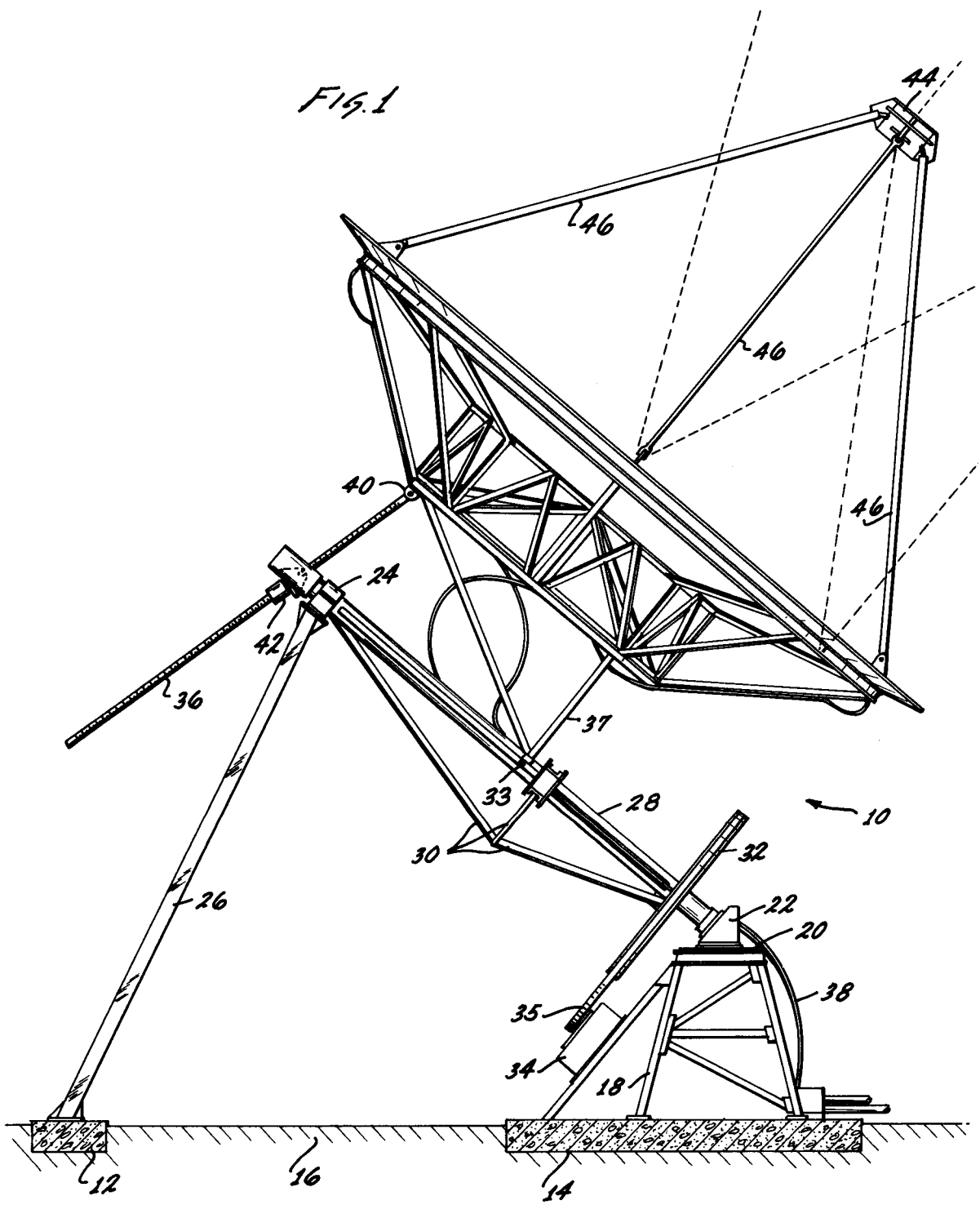
FIG. 1 is a diagramatic side view of an operational solar concentrator of the instant invention.

Referring now to FIG. 1, this is a side view showing of the concentrator of the instant invention mounted for operation and includes a showing of the associated mounting and positional apparatus for typical operation.

The solar concentrator 10 is supported by a pair of pillow blocks 12, only one shown, for rear support and a pedestal 14, for forward support. The pillow blocks and pedestal are embedded in the concentrator supporting surface 16. The support system includes a pair of rear uprights 26 spaced apart at the pillow blocks and terminating together at upper bearing mount 24 and a support stand 18 having an upper flat surface 20 for supporting a second lower bearing mount 22. A rotating beam 28 is positioned between the upper and lower bearing mounts for rotative relative movement therewith. A torsional support system 30 is provided to give additional longitudinal strength to rotating beam 28. A drive pinion gear or sprocket 32 is fixedly attached to the rotating beam and is driven by a controllable drive unit 34 through a sprocket and chain or drive gear 36. Any convenient means of rotating the concentrator may be utilized as desired. A feed cable 38 supplies external power as required for the drive unit and any additional periphery devices. The rotating beam 28 is equiped with concentrator mounting hardware to provide vertical movement to the concentrator in addition to the horizontal movement provided by rotating beam 28. This hardware consists of a pivot trunion 36 positioned fixedly attached at substantially the center of the rotating beam with a support bar 37 pivotly attached to the trunion at one end and the concentrator surface mounting hardware, hereinafter discussed in detail, positioned below the concentrator center line at the other end. A jack screw 36 has one end attached to the upper portion of the concentrator surface mounting hardware at pivot point 40 and passes through the upper end of the rotating beam 28. The physical rotation of nut 42 with respect to the jack screw allows for proper positioning of the solar collecting concentrator's outer surface with respect to the various seasonal positions of the sun.

A solar concentrator of this type is driven by drive unit 34 at a speed of approximately the time of day so that when properly positioned in vertical position, the equinox will be followed throughout the day.

The focal point 44 of the concentrator is forward of the concentrator surface and is held in place by a plurality of supporting rods 46.

The concentrator becomes a high energy source from which usable power can be extracted by commonly known methods. One such method is to place around this energy source a surface completely formed of pipes carrying the circulation of power producing or heat transferring fluid, as in a water tube boiler furnace. Another extraction means would be to apply the heat to a power thermocouple for direct conversion to electrical energy. There are other methods too numerous to mention but equally as well known in the heat to power conversion art.

Figure 2:
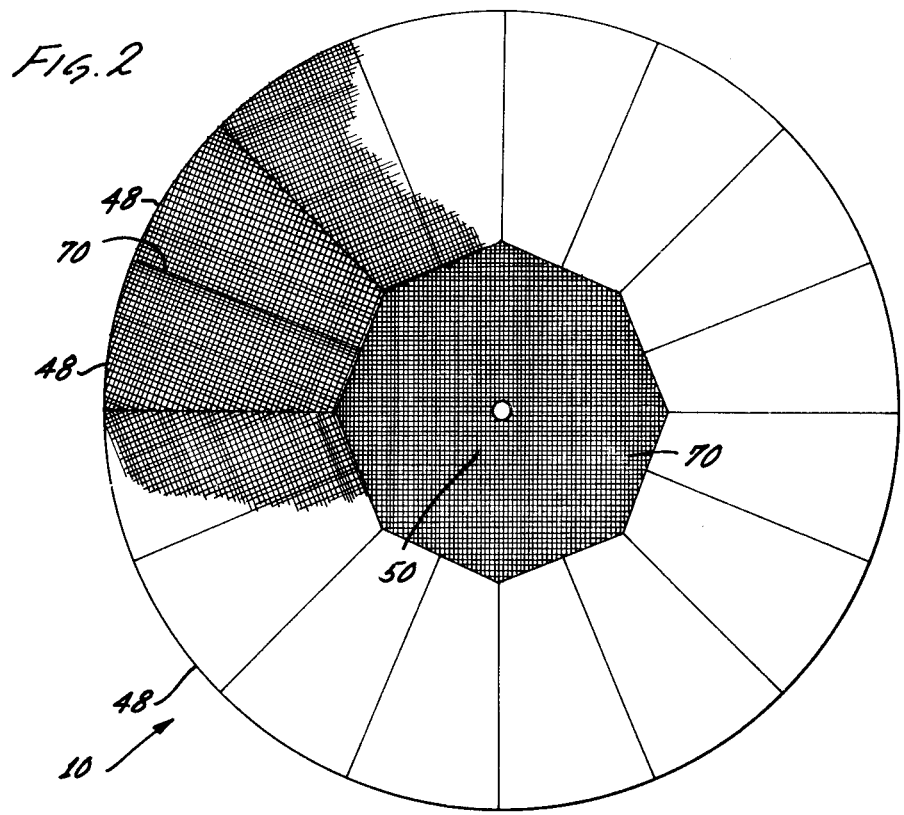
FIG. 2 is the front view of a solar concentrator.

FIG. 2 is a front view of the concentrator 10 of the instant invention constructed either in one piece or from a plurality of surface panels 48 clustered around center portion 50. The front surface of the concentrator contains a plurality of small rectangular glass segments hereinafter described in specific detail.

Figure 3:
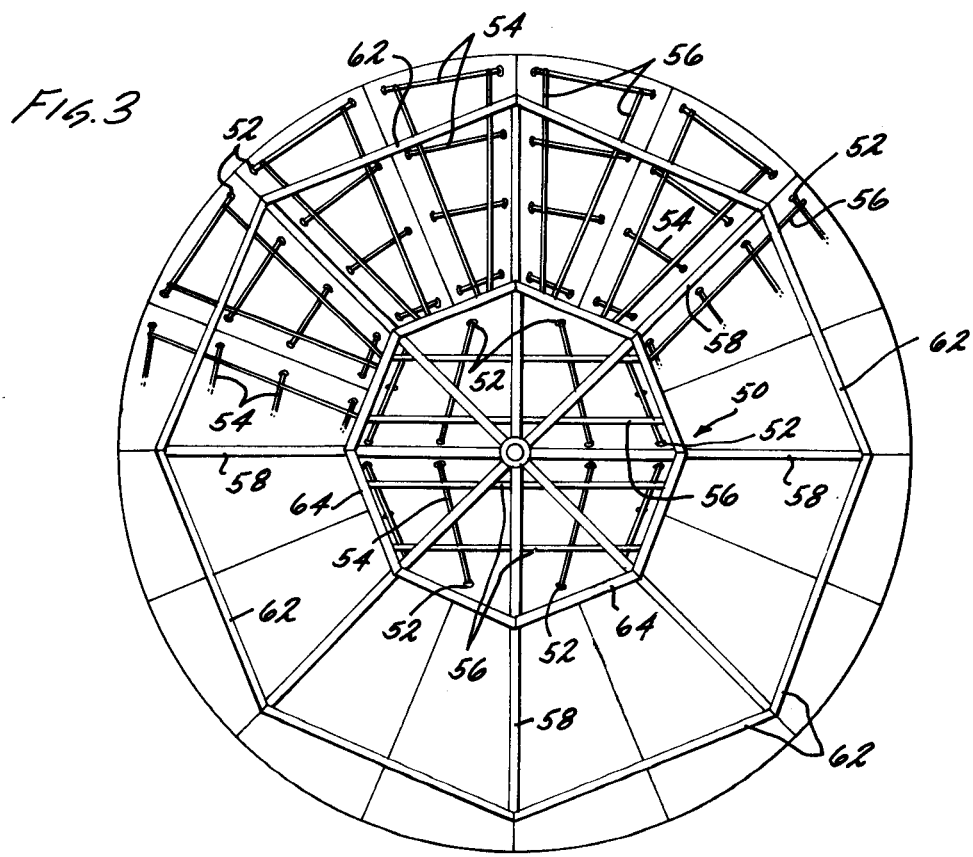
FIG. 3 is a rear view of the concentrator of FIG. 2 and including mounting means.

FIG. 3 is the rear of the concentrator 10 of FIG. 2 showing the panels 48 and center portion 50 and further includes hardware for assembling the various sections to form the concentrator. A detailed discussion of the assembly hardware is hereinafter included.

Referring now to FIG. 2, 3 and 4, it should be noted that the panels 48 are identical and are formed on the same configural mold members hereinafter discussed.

The various panels 48 and center portion 50 are supported to the antenna support structure, hereinafter discussed, by concentrator support hardware. Support pads 52 are attached to the rear surface of the panels 48 and center portion 50 by adhesive means or any other satisfactory permanant attachment means. Pads 52 may be of equal height as shown in FIG. 7 or of unequal height as shown by FIG. 5. Between the pads 52 cross-bars 54 are provided and are fixedly secured to the pads by convenient means, such as, welding, adhesive, bolts, etc. Main stiffners 56 span between and attach to the cross-bars as shown in the various figures and are attached to the cross-bars 54 in the same manner as the cross-bars are attached to the pads 52. The cross-bars 58, join at a hub or center ring portion. These cross members are interconnected by spacing bars 62, 64. The spacing bars 62 are in turn connected to the main stiffness 56 of each panel at their cross-over points 63, see FIG. 4. The inner connections of the various components of the support structure are made in the same manner as hereinbefore described for the pad 52, cross-bar 54 and main stiffness 56.

FIG. 5 is a cross-sectional view of FIG. 4 taken along lines 5—5. As can be seen in this figure, the pads 52 are of different heights. The center pad being shorter in height than the equal length outer pads. This feature provides for a true or straight cross-bar 54 configuration. Pads of equal height are used where the cross-bars are formed to follow the contour of the panel 48 as shown in FIG. 7. Either pad embodiment may be utilized to practice the invention and is merely a matter of design choice.

FIG. 6 is an enlarged end portion of panel 48 taken along lines 6—6 of FIG. 5 and further includes a portion of male and female mold members 66 and 68 respectively used in forming the panel structures 48 as well as the center portion 50 as hereinafter discussed.

It can be seen in FIGS. 2 and 6 that the panel structure comprises a sheet 70 of rectangular mirror segments positioned on its inner surface 72, a holding membrane 74 for holding the mirror segments in their required positional relationships. Two spaced apart layers of re-inforcing mesh 76 are shown. The mesh may be constructed of any suitable material, such as, for example, metal, fiberglass or the like but the invention would not be limited to any specific material. Although two spaced apart layers are shown in the perferred embodiment, larger panel sections may require additional layers while smaller panels may require only a single layer. Finished panels include a weather proof seal on all exposed surfaces of the panels.

The panel of FIG. 6, as well as the center panel, are constructed in the following manner.

A male mold member 66 is utilized for two purposes, namely, for supporting and forming the parted parabolic panel parts. A sheet of glass mirror 70 is pre-cut to a predetermined size so that it will effectively cover the entire inside surface area of the panel when conforming to the shape of the male mold member. This requires a flat sheet of mirror slightly larger than the contoured surface of the male mold member 66. This sheet 70 has a porous holding membrane 74 attached to one surface. If the holding membrane is to be removed after construction, it is applied to the front surface of the mirror and if the membrane is to become a permanant portion of the panel it is attached to the back mirror surface. On the preferred embodiment, the membrane is shown attached to the back surface of the mirror 70. The holding membrane is porous to liquid under pressure and may be constructed of any suitable material, such as, polyester or material having similar properties. Membrane 74 has a very important function in the fabrication of the panel of the invention. The membrane reacts to the pressure from the expanding expandable or pressurized material used in the panel structure causing the mirror segments to assume positions exactly tangent to the male mold member forming surface, as hereinafter discussed. The mirror 70, before being placed on the male member and after having the membrane attached, is scored at substantially right angles, although any configuration could be utilized to practice the invention, forming a grid of small rectangular segments, shown in FIG. 2, The glass mirror is then fractured along the grid lines so as to form a plurality of small rectangular mirror pieces. The sheet of now segmented small glass mirrors is placed on the male mold member 66 with its reflecting surface facing the male mold member with the membrane portion on its upper surface.

Next, a layer or layers of reinforcing mesh 76 is placed between the membrane and the upper female mold membrane 68. If two layers are to be used, the first layer is placed close to the surface of the membrane in a spaced apart relationship creating a void therebetween. A second layer is then positioned in an adjacent spaced apart relationship with the first layer creating a similar void therebetween. The layer or layers of mesh are spaced from adjacent components by any convenient spacing means either attached to the mold members or placed between the components and left within the finished panel structures.

The female mold member 68 is then positioned over the panel structure components and forms a sealed relationship with the male member. The inner surface of the female mold member 68 is spaced above the uppermost structure component. The female mold member 68 is provided with a plurality of openings 78 through its surface, two shown, for the filling of the mold with suitable material. Injection nozzles, well known in the plastic forming art, are attached to the openings 78 and the mold cavity 72 is then filled through these nozzles with a suitable liquid under pressure that will fill all the voids between the various components and mold members and cure to a configuration defining the inner mold cavity or partially filling the mold cavity in the same manner with an expandable material having the same or similar properties of uncured liquid polyurethane foam.

The pressure applied or developed within the mold cavity will become distributed uniformly through the mass. These pressures, as hereinbefore mentioned, have an important effect in positioning the mirror segments of mirror 70 into accurate alignment with the upper surface of the male mold member 66. The internal pressure is applied against the back surface of each flat mirror segment through the flexible membrane. This force is resisted by the male mold member. The center of force upon each mirror segment is at the centeroid of its surface area. If a mirror segment is not in exact alignment with the surface of the male mold member, the point of contact will not be in the center. The two opposing forces not in alignment cause a rotating couple which causes the mirror segment to tilt until a positional error is eliminated and the forces become equal.

The only restraints which would impede this alignment adjustment is the flexible membrane and the frictional resistance of the mirror contact with the male mold member. To prevent friction of movement at this point, the surface of the male member is coated with a lubricious material such as teflon or any one of the various materials having similar properties.

It has been found that equally satisfactory results may be achieved by filling the voids within the mold cavity 50 under pressure with any polymerized liquid resin, such as, polyester, polyurethane, epoxy or materials having similar high strength to weight properties.

Under either of the above methods of construction, each mirror segment takes the proper alignment with each of the other mirror segments to form a very close and useful approximation of a portion of a true paraboloid of revolution.

Studies of model reflectors produced by this method have established positional accuracy of the mirror segments to better than one-tenth of a degree of the true deflection angle.

After the material injected within the mold cavity 80 is cured, the mold members are separated and the completed panel or center section is removed. The supporting apparatus, as hereinafter described, is installed on the panel and the panel is then ready to form the ultimate parabolic solar concentrator shown in FIG. 1.

FIG. 7, as hereinbefore mentioned, is a perspective view of the panel 48 of FIG. 4 showing the various holding components. The pads 52 in this configuration are of equal heights. The cross-bars 54 are similar to the showing of FIG. 4, except the main stiffness channel 56 is shown in the configuration formed to follow the parabolic curvature of the panel surface.

It should be noted that although the preferred embodiment of the concepts of the instant invention are applied to the construction of a solar concentrator, they could be applied equally as satisfactory to an inexpensive antenna system or the like requiring the concave or convex form.

The invention may be embodied in other specific forms without departing from the spirit or essential characteristics thereof. The present embodiment is, therefore, to be considered in all aspects as illustrative and not restrictive. The scope of the invention being indicated by the forgoing description and all changes which come within the meaning and range of equivalency of these claims are, therefore, intended to be embraced therein.

What is claimed as new and useful and desired to be secured by U.S. Letters Patent is:

1. An improved solar concentrator comprising:
   a base member having an outer surface and an inner concave surface, said base member constructed of a polymerized resin;
   a reflective means forming a portion of said concave surface, said reflective means comprising a plurality of side by side flat mirror segments partially embedded in said base member; and
   at least one layer of reinforcing material embedded within said base member and positioned intermediate said surfaces.

2. The invention of claim 1 wherein said base member is a unitary structure.

3. The invention of claim 1 wherein said base member comprises a plurality of interconnected separate panels.

4. The invention of claim 3, wherein said plurality of panels include a plurality of inner panels of like configuration and a plurality of outer panels of like configuration, said inner and outer panels having a different configuration.

5. The invention of claim 1, wherein said base member is in the form of a paraboloid.

6. The invention of claim 1, wherein said polymerized resin is polyester.

7. The invention of claim 1, wherein said polymerized resin is polyurethane.

8. The invention of claim 1, wherein said polymerized resin is polyurethane foam.

9. The invention of claim 1, wherein said polymerized resin is epoxy.

10. The invention of claim 1, wherein a plurality of spaced apart layers of reinforcing material spaced from said surfaces are embedded in said base member.

11. The invention of claim 1, wherein said reinforcing material is of a mesh construction.

12. The invention of claim 11, wherein said reinforcing material is fiberglass.

13. The invention of claim 1, wherein the outer surface of said base member, free from reflective surface, includes a sealing means.

14. An improved solar energy concentrator comprising:
   an expanded polyurethane foam base member having a convex outer surface and a concave inner surface;
   a reflective surface comprised of a plurality of small flat rectangular mirror segments partially embedded in said concave surface;
   at least one layer of fiberglass mesh screen reinforcing material embedded within said base member and positioned substantially in a parallel spaced relationship with said surfaces for reinforcing said base member; and
   a sealing means on the outer surfaces of said base member free from reflective surface.

* * * * *